Figure 1:
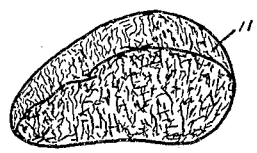

Dec. 6, 1927.

T. W. MILLER

TOY

Filed Jan. 19, 1927

1,651,962

Thomas W. Miller
Inventor
by Smith and Freeman
Attorneys

Patented Dec. 6, 1927.

1,651,962

UNITED STATES PATENT OFFICE.

THOMAS W. MILLER, OF ASHLAND, OHIO, ASSIGNOR TO THE FAULTLESS RUBBER COMPANY, OF ASHLAND, OHIO, A CORPORATION OF OHIO.

TOY.

Application filed January 19, 1927. Serial No. 162,146.

Figure 2:
Figure 3:
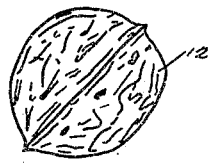
Figure 4:
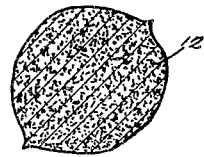
Figure 5:
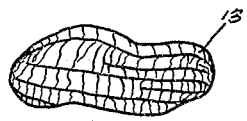
Figure 6:
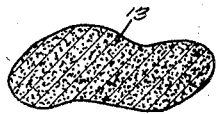
Figure 7:
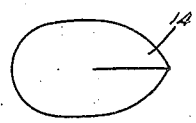
Figure 8:
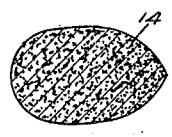

My invention relates to toys, and particularly to sponge rubber simulations of nuts, and the principal object of my invention is to provide a new and improved toy of this type. In the drawings accompanying this specification and forming a part of the application I have shown, for purposes of illustration, certain forms which my invention may assume, and in these drawings:

Figure 1 is a side elevation of one form of my invention illustrated herein,

Figure 2 is a central longitudinal section through the form of my invention shown in Figure 1, Figures 3 and 4 are views similar to Figures 1 and 2 showing a second form which my invention may assume, Figures 5 and 6 are also views similar to Figures 1 and 2 showing a third form which my invention may assume, while Figures 7 and 8 are further views similar to Figures 1 and 2 showing a fourth form which my invention may assume.

According to the embodiment of my invention shown in Figures 1 and 2 I form from sponge rubber and in a suitable mold a sponge rubber simulation 11 of a Brazil nut, the sponge rubber being formed of a contour accurately simulating the contour of a real Brazil nut, and with a skin accurately simulating the surfacing of a real Brazil nut, and with at least the outer surface of the simulation 11 formed of a color accurately simulating the color of the exterior of a real Brazil nut.

In Figures 3 and 4 I have shown my invention as applied to a simulation 12 of an English walnut, in Figures 5 and 6 as applied to a simulation 13 of a peanut, and in Figures 7 and 8 as applied to a simulation 14 of a pecan nut, the simulation in each case simulating the real nut accurately and closely both in contour and in surfacing and in surface coloring.

From the above description it will be obvious to those skilled in the art that I have provided new and improved toys, and accordingly that I have accomplished at least the principal object of my invention.

At the same time it will also be obvious to those skilled in the art that the embodiments of my invention herein shown and described may be variously changed and modified without departing from the spirit of my invention, or sacrificing the advantages thereof, and it will therefore be understood that the disclosure herein is illustrative only, and that my invention is not limited thereto.

I claim:

1. A toy object formed essentially of sponge rubber, and of a contour and coloring simulating a nut.

2. A toy object formed essentially of sponge rubber, and of a contour and coloring simulating a nut from which any husk exteriorly of the shell has been removed.

3. A toy object formed essentially of sponge rubber, and of a contour and coloring simulating a nut in its customary unshelled retail condition.

In testimony whereof I hereunto affix my signature.

THOMAS W. MILLER.